(12) United States Patent
Chou et al.

(10) Patent No.: US 10,875,344 B2
(45) Date of Patent: Dec. 29, 2020

(54) RECORDING MEDIA

(71) Applicant: Hewlett-Packard Development Company, L.P., Fort Collins, CO (US)

(72) Inventors: Beverly Chou, San Diego, CA (US); Tao Chen, San Diego, CA (US); Xulong Fu, San Diego, CA (US); Or Brandstein, San Diego, CA (US); Fereshteh Khorrami, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/309,893

(22) PCT Filed: Oct. 10, 2017

(86) PCT No.: PCT/US2017/055837
§ 371 (c)(1),
(2) Date: Dec. 13, 2018

(87) PCT Pub. No.: WO2018/071363
PCT Pub. Date: Apr. 19, 2018

(65) Prior Publication Data
US 2020/0086670 A1    Mar. 19, 2020

Related U.S. Application Data

(63) Continuation-in-part of application No. PCT/US2016/056460, filed on Oct. 11, 2016.

(51) Int. Cl.
*B41M 5/50* (2006.01)
*D21H 19/82* (2006.01)
(Continued)

(52) U.S. Cl.
CPC ............. *B41M 5/502* (2013.01); *B32B 23/00* (2013.01); *B32B 27/20* (2013.01); *B32B 27/26* (2013.01);
(Continued)

(58) Field of Classification Search
CPC ...... B41M 5/502; B41M 5/506; B41M 5/508; B41M 5/5245; B41J 2/01; B05D 1/00; B05D 5/04
(Continued)

(56) References Cited

U.S. PATENT DOCUMENTS 5,879,442 A * 3/1999 Nishiguchi ........... C01F 11/185
106/464
6,150,289 A    11/2000 Chen et al.
(Continued)

FOREIGN PATENT DOCUMENTS

EP    0183467    6/1986
EP    1861258    12/2007
(Continued)

OTHER PUBLICATIONS

International Search Report dated Feb. 7, 2018 for PCT/US2017/055837, Applicant Hewlett-Packard Development Company, L.P.
(Continued)

*Primary Examiner* — Betelhem Shewareged
(74) *Attorney, Agent, or Firm* — Thorpe North & Western LLP

(57) ABSTRACT

The present disclosure is drawn to a recording medium including a substrate, a first coating applied to the substrate, and a second coating applied to the first coating. The first coating can include inorganic pigment, fixative agent, and a first binder. The second coating can include inorganic nanoparticles, aluminum silicate, and a second binder.

18 Claims, 1 Drawing Sheet

(51) Int. Cl.
| | |
|---|---|
| B41M 5/52 | (2006.01) |
| D21H 19/54 | (2006.01) |
| C09D 7/61 | (2018.01) |
| B32B 27/26 | (2006.01) |
| C08L 9/00 | (2006.01) |
| D21H 19/36 | (2006.01) |
| C08K 3/34 | (2006.01) |
| B32B 27/32 | (2006.01) |
| D21H 19/38 | (2006.01) |
| B32B 27/30 | (2006.01) |
| B32B 27/36 | (2006.01) |
| D21H 19/56 | (2006.01) |
| D21H 19/52 | (2006.01) |
| C08K 3/10 | (2018.01) |
| D21H 15/02 | (2006.01) |
| B32B 27/20 | (2006.01) |
| B32B 27/42 | (2006.01) |
| B32B 23/00 | (2006.01) |
| C09D 7/40 | (2018.01) |
| D21H 21/52 | (2006.01) |
| C08K 3/013 | (2018.01) |
| D21H 19/44 | (2006.01) |
| D21H 19/40 | (2006.01) |
| D21H 19/58 | (2006.01) |
| D21H 19/60 | (2006.01) |
| D21H 19/64 | (2006.01) |
| C08K 3/26 | (2006.01) |

(52) U.S. Cl.
CPC .............. *B32B 27/30* (2013.01); *B32B 27/32* (2013.01); *B32B 27/36* (2013.01); *B32B 27/42* (2013.01); *B41M 5/506* (2013.01); *B41M 5/508* (2013.01); *B41M 5/52* (2013.01); *B41M 5/5218* (2013.01); *B41M 5/5236* (2013.01); *B41M 5/5254* (2013.01); *C08K 3/013* (2018.01); *C08K 3/10* (2013.01); *C08K 3/34* (2013.01); *C08L 9/00* (2013.01); *C09D 7/61* (2018.01); *C09D 7/70* (2018.01); *D21H 15/02* (2013.01); *D21H 19/36* (2013.01); *D21H 19/38* (2013.01); *D21H 19/385* (2013.01); *D21H 19/40* (2013.01); *D21H 19/44* (2013.01); *D21H 19/52* (2013.01); *D21H 19/54* (2013.01); *D21H 19/56* (2013.01); *D21H 19/58* (2013.01); *D21H 19/60* (2013.01); *D21H 19/64* (2013.01); *D21H 19/822* (2013.01); *D21H 21/52* (2013.01); *C08K 2003/265* (2013.01); *C08K 2201/011* (2013.01)

(58) Field of Classification Search
USPC ........................................ 428/32.25
See application file for complete search history.

(56) References Cited

U.S. PATENT DOCUMENTS

| | | |
|---|---|---|
| 8,114,487 B2 | 2/2012 | Schultz et al. |
| 9,370,957 B2 | 6/2016 | Nagoshi |
| 2001/0009712 A1 | 7/2001 | Totani et al. |
| 2003/0134093 A1* | 7/2003 | Kitamura ............ B41M 5/5227 428/195.1 |
| 2003/0152720 A1 | 8/2003 | Lubar |
| 2004/0012663 A1* | 1/2004 | Takashima ............... B41M 5/52 347/100 |
| 2006/0102304 A1 | 5/2006 | Nutbeem et al. |
| 2007/0202264 A1 | 8/2007 | Ruschak et al. |
| 2009/0035489 A1 | 2/2009 | Kaimoto |
| 2009/0136692 A1 | 5/2009 | Takahashi et al. |
| 2009/0214806 A1 | 8/2009 | Kobayashi |
| 2011/0052818 A1 | 3/2011 | Osterberg et al. |
| 2011/0111144 A1 | 5/2011 | Wasai et al. |
| 2011/0212278 A1 | 9/2011 | Watanabe et al. |
| 2012/0154502 A1 | 6/2012 | Romano, Jr. et al. |
| 2012/0194625 A1 | 8/2012 | Niu et al. |
| 2013/0034656 A1 | 2/2013 | Sarkisian et al. |
| 2013/0260992 A1* | 10/2013 | Nahm ................. C09D 125/14 503/201 |

FOREIGN PATENT DOCUMENTS

| | | |
|---|---|---|
| EP | 2988948 | 11/2017 |
| JP | 2014109075 | 6/2014 |
| RU | 2304651 | 8/2007 |
| WO | 0066510 | 11/2000 |
| WO | 0181078 | 11/2001 |
| WO | 2009117649 | 9/2009 |
| WO | 2013015767 | 1/2013 |
| WO | 2015152862 | 10/2015 |

OTHER PUBLICATIONS

Calcium Carbonate / pulp paper mill, http://www.pulppapermill.com/calcium-carbonate/, retrieved Feb. 19, 2019.

* cited by examiner

RECORDING MEDIA

BACKGROUND

Inkjet printing has become a popular way of recording images on various types of media. Some of the reasons include low printer noise, variable content recording, capability of high speed recording, and/or multi-color recording. These advantages can be obtained at a relatively low price to consumers. As the popularity of inkjet printing increases, the types of use also increase providing demand for new types of inks or recording media. For example, recording media such as sheet media and web media can be used to receive pigmented ink to form images thereon. The images can be in a form of designs, symbols, photographs, and/or text. For example, pigmented ink can be applied to recording media by an ink applicator unit, such as an inkjet printer.

BRIEF DESCRIPTION OF THE DRAWING

Features of the present disclosure are illustrated by way of example and not limited in the following figures, in which like numerals indicate like elements, and in which.

DETAILED DESCRIPTION

Figure 1:
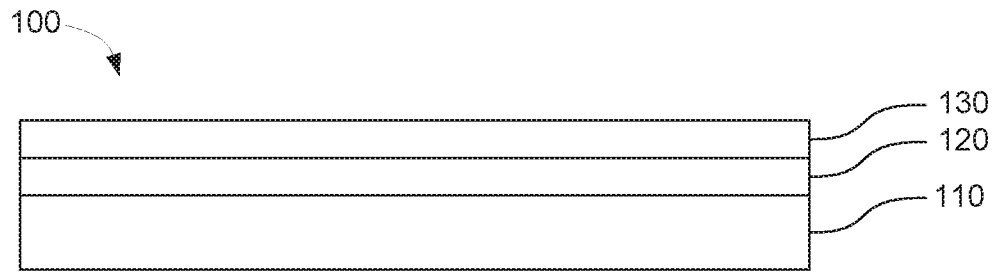
FIG. 1 is a cross-sectional view illustrating an example recording medium prepared in accordance with the present disclosure.

Recording media, such as media suitable for high speed printing, can present unique challenges with respect to print durability due to the equipment often used in high speed printing apparatuses. Furthermore, many specific applications can further benefit from a high gloss finish. For example, an inkjet web press, such any of the HP PageWide Web Press systems available from HP, Inc., can print at very high speeds. For example, HP PageWide Web Press systems can print at speeds from 100 feet per minute (fpm), from 200 fpm, or from 400 fpm, with many specific HP PageWide Web Press systems allowing for print speeds of up to 500 fpm, up to 800 fpm, or up to even 1000 fpm. These very high print speeds can present challenges in achieving high gloss and high durability while retaining acceptable image quality.

In accordance with this, the present disclosure is drawn to a recording medium including a substrate, a first coating applied to the substrate, and a second coating applied to the first coating. The first coating can include inorganic pigment, fixative agent, and a first binder. The second coating can include inorganic nanoparticles, aluminum silicate, and a second binder.

In further detail, in one example, the inorganic pigment of the first coating can include plate-shaped aluminum silicate, irregularly-shaped aluminum silicate, irregularly-shaped rhombohedral calcium carbonate, or a mixture thereof. Other types of inorganic pigments can likewise be used. In another example, the first binder and the second binder can independently include a conjugated diene copolymer latex, an acrylic copolymer latex, a vinyl copolymer latex, a urethane resin latex, an alkyl resin latex, an unsaturated polyester resin latex, a thermosetting synthetic resin, a starch derivative, a cellulose derivative, a polyvinyl alcohol derivative, a natural polymeric resin, vinyl polymer, a sodium alginate, a polypropylene glycol, a polyethylene glycol, a maleic anhydride, or a combination thereof, or a copolymer thereof. More specifically, in one example, the first binder and the second binder can independently include styrene-butadiene copolymer, polyvinyl alcohol, or a combination thereof. In further detail regarding the first coating, the first binder can be present at from about 1 to about 18 mass parts with respect to 100 mass parts of a total solid content of the inorganic pigment in the first coating. Furthermore, the second binder in the second coating can be present from about 1 to about 20 mass parts with respect to 100 mass parts of a total solid content of the inorganic nanoparticles and the aluminum silicate in the second coating. The fixative agent can include a polyvalent cation salt which has a cation selected from calcium, cadmium, copper, iron, magnesium, nickel, zinc, aluminum, or zirconium. Furthermore, the fixative agent in the first coating can be present at from about 2 to about 10 mass parts with respect to 100 mass parts of a total solid content of the inorganic pigment in the first coating. With respect to the second coating, the inorganic nanoparticles can be selected from boehmite, hydrated alumina, fumed alumina, colloidal silica, precipitated silica, silica gel, fumed silica, or a combination thereof. The aluminum silicate in the second coating can be irregularly-shaped calcined clay, plate-shaped calcined clay, or a combination thereof. In another example, the aluminum silicate in the second coating can have an average aspect ratio from 1:1 to 25:1. In further detail, the inorganic nanoparticles and the aluminum silicate can be present in the second coating at a weight ratio of 2:1 to 1:5. The first coating can have a first dry coat weight from 4 $g/m^2$ to 20 $g/m^2$, and the second coating can have a second dry coat weight from 2 $g/m^2$ to 8 $g/m^2$.

In another example, a method of making a recording medium can include applying a first coating to a substrate, and applying a second coating to the first coating. The first coating can include inorganic pigment, fixative agent, and a first binder. The second coating can include inorganic nanoparticles, aluminum silicate, and a second binder. In one example, the first coating can be applied to have a first dry coat weight from 4 $g/m^2$ to 20 $g/m^2$, and the second coating can be applied to have a second dry coat weight from 2 $g/m^2$ to 8 $g/m^2$. The method can further include calendering one or both of the first coating or the second coating at from 50° C. to 150° C. at a pressure from 1,000 psi to 3,500 psi. In this example, the recording medium can exhibit a media gloss of at least 55% reflectance measured at 75°.

In another example, a method of printing can include inkjetting an ink composition onto a recording medium at a printing speed of at least 100 feet per minute to generate an image. The recoding medium can include a substrate, a first coating applied to the substrate, and a second coating applied to the first coating. The first coating can include inorganic pigment, fixative agent, and a first binder. The second coating can include inorganic nanoparticles, aluminum silicate, and a second binder. In one example, the method can further include calendering the recording medium at from 50° C. to 150° C. at a pressure from 1,000 psi to 3,500 psi to generate a media gloss of least 55% reflectance measured at 75°. Furthermore, when printed thereon with the ink composition, such as a pigmented ink composition suitable for use with a web press printer, a color gloss of at least 70% reflectance measured at 75° can also be achieved.

It is noted that when discussing the recording medium, the method of making the recording medium, or the method of printing, each of these discussions can be considered applicable to other examples whether or not they are explicitly discussed in the context of that example unless expressly indicated otherwise. Thus, for example, when discussing irregularly-shaped aluminum silicate related to the recording medium, such disclosure is also relevant to and directly supported in context of various methods, and vice versa. Furthermore, for simplicity and illustrative purposes, the present disclosure is described by referring mainly to examples thereof. In the following description, numerous specific details are set forth in order to provide a thorough understanding of the present disclosure. It will be readily apparent, however, that the present disclosure can be practiced without limitation to these specific details. In other instances, some methods and structures have not been described in detail so as not to unnecessarily obscure the present disclosure.

Turning now to FIG. 1, a recording medium 100 is shown that can include a substrate 110, a first coating 120 applied to the substrate, and a second coating 130 applied to the first coating. The first coating can include inorganic pigment, fixative agent, and a first binder. The second coating can include inorganic nanoparticles, aluminum silicate, and a second binder. The recording medium can exhibit one or more properties, such as high gloss, acceptable durability, and high image quality, for example.

The recording medium 100 can be used in a high speed inkjet web press, such as an HP PageWide Web Press, for example, printing at a speed of at least 100 feet per minute (fpm), at least 200 fpm, or at least 400 fpm, for example. More specific examples include print speeds from 100 fpm to 1000 fpm, from 200 fpm to 800 fpm, from 400 fpm to 1000 fpm, from 100 fpm to 500 fpm, from 200 fpm to 1000 fpm, etc. In some example, a printing method can include a high-speed web press printing method. A "web press," for example, can be defined to include printing technology encompassing an array of inkjet nozzles that span the width of the paper web. The array can thus be able, for example, to print on 20", 30", and 42", or wider rolled papers. In some examples, the printing method as described herein prints using one-pass only, or two-passes. Thus, the paper passes under each nozzle and printhead only one time, or just twice, as opposed to scanning type printers where the printheads move over the same area of paper many times and only a fraction of total ink is used during each pass. One-pass printing puts 100% of the ink from each nozzle/printhead down all at once and is therefore more demanding on the ability of the paper to handle all of the ink in a very short amount of time. In another example, however, the printing method can also encompass a two-pass configuration, which can still be demanding with respect to rapid ink absorption, as two-passes is often fewer passes than is used by other types of printers.

The substrate 110 for use in the recording medium 100 can be a base paper. For example, the substrate can include cellulose fibers and/or non-cellulose fibers, such as synthetic fibers. The substrate can also include a polymeric binder. The polymeric binder can be included, for example, when either cellulose or synthetic fibers are used. The cellulose fibers can be made from hardwood or softwood species. The synthetic fibers can be made from polymerization of organic monomers. The substrate can be formed with a pilot paper machine with a pulp, or the like.

A base paper, for example, can be made by conventional methods of making acid-, neutralized-, or alkaline-papers from paper stuff, including cellulose pulp selected from chemical pulp such as LBKP (Leaf Bleached Kraft Pulp), and/or NBKP (Needle Bleached Kraft Pulp); mechanical pulp such as GP (Groundwood Pulp), PGW (Pressure GroundWood pulp), RMP (Refiner Mechanical Pulp), TMP (ThermoMechanical Pulp), CTMP (ChemiThermoMechanical Pulp), CMP (ChemiMechanical Pulp), and/or CGP (ChemiGroundwood Pulp); and/or waste paper pulp such as DIP (Delnked Pulp) (these can be used alone or in combination).

The substrate 110 can include other additives, such as a pigment dispersant, a thickener, a flow modifier, a defoamer, an antifoamer, a releasing agent, a foaming agent, a penetrant, a coloring dye, a coloring pigment, an optical brightener, an ultraviolet absorber, an antioxidant, a preservative, a fungicide, an insolubilizer, a wet paper strengthening agent, or a dry paper strengthening agent within a range that does not impair the desired effects of the first and second coatings on the recording medium 100.

The substrate 110 can likewise have any degree of sizing that does not impair the desired effects of the disclosed recording medium 100. The degree of sizing of the substrate can be adjusted by the amount of an internal sizing agent and/or the coating weight of a surface sizing agent that is applied on the base paper. An example of the internal sizing agent for acid base paper is a rosin sizing agent, and examples of the internal sizing agent for acid-free base paper can include alkenyl succinic anhydride, alkyl-ketene dimer, an acid-free rosin sizing agent, and/or a cationic styrene-acryl sizing agent. Examples of the surface sizing agent can include a styrene-acryl sizing agent, an olefin sizing agent, and/or a styrene-maleic sizing agent.

Although the thickness of the substrate 110 is not particularly limited, the substrate can have a thickness of from about 50 µm to about 300 µm, and for example, from about 80 µm to about 250 µm.

In one example, the substrate 110 can be calendered before application of the first coating 120 and the second coating 130, and in other examples, the substrate might not be calendered prior to application of the first and second coatings.

As mentioned, the recording medium 100 can also include a first coating 120. The first coating can be applied on the substrate 110, and can include an inorganic pigment, fixative agent, and a first binder.

The inorganic pigment in the first coating 120 can include fumed an alumina such as boehmite, hydrated alumina, fumed alumina, etc., a silica such as colloidal silica, precipitated silica, silica gel, fumed silica, etc., titanium dioxide, grounded calcium carbonate, aluminum silicates such as clay, kaolin, calcined clay, etc., or a combination thereof. Thus, the term "inorganic pigment" includes all of these compounds or compositions, or any other compounds or compositions that are inorganic and can provide the function of an inorganic pigment.

In one example, the inorganic pigment can be plate-shaped, irregularly-shaped, and/or an irregularly-shaped rhombohedral. In further detail, multiple inorganic pigments can be present of the same or different shape. Examples of plate-shaped and/or irregularly shaped inorganic pigments that can be used include clay, calcined clay, and/or kaolin, for example. In other examples, a plate-shaped inorganic pigment, such as calcined clay, can be present in the first coating 120, by dry weight, at from about 20% to about 50%, from about 30% to about 45%, or from about 35% to about 40%, based on the inorganic pigment content total in the first coating. In some instances, this inorganic pigment, other similar pigments, can also be considered to be "irregularly-shaped," in that it can have angular edges and voids, and on average, may not be generally completely smooth and/or uniformly flat in its morphology. However, it is noted that an irregularly-shaped inorganic pigment can still have an average aspect ratio of about 1:1, e.g., from 1:1 to 25:1, because angular edges and voids may provide a particle with a low aspect ratio, though not smooth or substantially spherical.

In another example, ground calcium carbonate can be included as an inorganic pigment in the first coating 120, and in one example, can generally have irregularly-shaped rhombohedral morphology. In further detail, the ground calcium carbonate can have a narrow particle size distribution and low aspect ratio (ratio from the longest axis to the shortest axis, generally being length to width) where 96% by weight of the particles can be less than about 2 microns in diameter, and the aspect ratio can be less than about 5:1, less than about 4:1, or less than about 3:1. With specific reference to the calcium carbonate content only, if included, calcium carbonate particles can be included that have a narrow particle size distribution. For example, at least about 80% by weight of the particles can be less than about 1 micron and can fall within the range of about 0.1-1 microns. In another example, the particle size distribution can include at least about 85% by weight of the particles less than about 1 micron and fall in the range of about 0.1-1 microns. In another example, about 98% by weight of the particles can be less than about 2 microns in diameter. Yet another example can include ground calcium carbonate with about 98% by weight of the particles falling in the range of about 0.1-1.0 microns. One example of a ground calcium carbonate having a narrow particle size distribution can be OMYA COVERCARB® 85 ground calcite calcium carbonate (OMYA AG, Oftringen, Switzerland). In another example, the calcium carbonate inorganic pigment can be present in the first coating, by dry weight, at from about 40% to about 75%, from about 50% to about 70%, or from about 55% to about 65%, based on the inorganic pigment content total in the first coating.

In certain specific examples, the inorganic pigment can include the aluminum silicate, the calcium carbonate, or a combination of both. For example, a combination of the aluminum silicate (e.g., calcined clay) and the calcium carbonate can be present in the first coating 120 in an amount of at least about 85 mass parts per 100 mass parts, at least about 90 mass parts per 100 mass parts, or at least about 95 mass parts per 100 mass parts of the total solid content of the total inorganic pigment content, such as 100 mass parts per 100 mass parts of the solid content of the total inorganic pigment. In another example, the inorganic pigment can be a calcined clay in the first coating in an amount of about 40 mass parts per 100 mass parts of the solid content of the total inorganic pigment. In another example, the inorganic pigment can be a ground calcium carbonate in the first coating in an amount of about 60 mass parts per 100 mass parts of the solid content of the total inorganic pigment.

The first coating 120 can include a first binder. The first binder can include a water-dispersible binder, a water-soluble binder, or a combination thereof. The water-dispersible binder includes but is not limited to conjugated diene copolymer latexes, such as styrene-butadiene copolymer or acrylonitrile-butadiene copolymer; acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and thermosetting synthetic resins, such as melamine resins and urea resins, and combinations thereof. The water-soluble binder can include, but is not limited to, starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and gelatin or their modified products, soybean protein, pullulan, gum arabic, karaya gum, and albumin or their derivatives; vinyl polymers such as sodium polyacrylate, polyacrylamide, and polyvinylpyrrolidone; sodium alginate; polypropylene glycol; polyethylene glycol; maleic anhydride; or copolymers thereof. In an example, the first binder of the first coating includes a styrene-butadiene copolymer, such LITEX PX 9740 (Synthomer) and a polyvinyl alcohol, such as MOWIOL® 4-98 (Kuraray America Inc.).

In one example, the first binder can be present in the first coating 120 in an amount of from about 1 to about 18 mass parts with respect to 100 mass parts of the total solid content of the inorganic pigment in the first coating. In another example, the first binder can be present in the first coating in an amount of from about 3 to about 12 mass parts with respect to 100 mass parts of the total solid content of the inorganic pigment in the first coating. As a further example, the first binder can be present in the first coating in an amount of from about 5 to about 11 mass parts with respect to 100 mass parts of the total solid content of the inorganic pigment in the first coating.

The first coating 120 can also include a fixative agent. The fixative agent can be a salt of a polyvalent ion, such as a polyvalent anion salt or a polyvalent cation salt. The valency of the ion refers to the overall charge of the ionic species and is determined by the various oxidation states of the metal. Thus, for example, if the polyvalent ion is the cation of the salt, the charge is the overall charge of the cationic species. In an example, the polyvalent cation salt is a polyvalent metal cation.

Many types of polyvalent cations can be used as a salt as the fixative agent in the first coating 120. Examples of polyvalent cations include, but are not limited to, calcium, cadmium, copper, iron, magnesium, nickel, zinc, aluminum, or zirconium cations and, in particular, $Ca^{+2}$, $Cd^{+2}$, $Cu^{+2}$, $Fe^{+2}$, $Mg^{-2}$, $Ni^{+2}$, $Zn^{+2}$, $Al^{+3}$, $Fe^{+3}$, and $Zr^{+4}$. In further detail, the fixative agent can be a polyvalent cation salt of calcium, cadmium, copper, iron, magnesium, nickel, zinc, aluminum, or zirconium. Non-limiting examples of the salt used as the fixative agent in the first coating include calcium chloride, calcium acetate, calcium nitrate, magnesium chloride, magnesium acetate, magnesium nitrate, magnesium sulfate, barium chloride, barium nitrate, zinc chloride, zinc nitrate, aluminum chloride, aluminum hydroxychloride, and aluminum nitrate. Similar salts will be appreciated by the skilled artisan. Particularly useful salts include $CaCl_2$, $MgCl_2$, $MgSO_4$, $Ca(NO_3)_2$, and $Mg(NO_3)_2$, including hydrated versions of these salts. Combinations of the salts can also be used.

The fixative agent can be present in the first coating 120 in an amount of about 1 to about 10 parts, more particularly about 3 to about 6 parts by weight based per 100 total parts of inorganic pigment. As the amount of the fixative agent present in the first coating increases beyond 10 mass parts, then the gloss present on the recording medium 100 can decrease.

The first coating 120 can also include additional components and/or additives, such as a pigment dispersant, a thickener, a flow modifier, a viscosity stabilizer, a pH adjuster, a surfactant, a defoamer, an antifoamer, a releasing agent, a foaming agent, a penetrant, a coloring dye, a coloring pigment, a white inorganic pigment, a white organic pigment, an optical brightener, an ultraviolet absorber, an antioxidant, a leveling agent, a preservative, a fungicide, an insolubilizer, a wet paper strengthening agent, and/or a dry paper strengthening agent as appropriate.

The first coating 120 can be applied at a coating weight ranging from about 4 g/m² to 20 g/m², from about 4 to about 15 g/m², from about 5 to about 10 g/m², or from about 8 to about 8 g/m².

The recording medium 100 can also include a second coating 130. The second coating can be applied on the first coating 120, and can include can include inorganic nanoparticles, aluminum silicate, and a second binder. Notably, "inorganic nanoparticles" and "aluminum silicate" are each a subset of the genus "inorganic pigments" generally described with respect to the first coating. Thus, in accordance with the present disclosure, the second coating includes a more specific combination of two inorganic pigments that may or may not also be present in the first coating.

The term "inorganic nanoparticles" is defined herein to include a subset of the inorganic pigments, such as metal- or semi-metal oxide particles in the nano-size range, e.g., from 10 nm to 700 nm. For example, inorganic nanoparticles found in the second coating 130 (and possibly in the first coating 120 if used therein) can include alumina particles such as boehmite, hydrated alumina, fumed alumina, etc., as well as silica particles such as colloidal silica, precipitated silica, silica gel, fumed silica, etc., or any combination thereof. Fumed silica can be composed of agglomerates of many non-porous particles of amorphous silica particles produced by high temperature hydrolysis of silicon tetrachloride. A silica gel can include porous amorphous silica particles with internal small pores, and can be manufactured from acid treatment of sodium silicate solution.

With specific reference to the inorganic nanoparticles, if silica is used, it can be selected from the following group of commercially available fumed silicas: Cab-O-Sil®LM-150, Cab-O-Sil®M-5, Cab-O-Sil®MS-55, Cab-O-Sil®MS-75D, Cab-O-Sil®H-5, Cab-O-Sil®HS-5, and/or Cab-O-Sil®EH-5 (all available from Cabot) and/or Aerosil®150, Aerosil®200, Aerosil®300, Aerosil®350, and/or Aerosil®400 (available from Evonik). The inorganic nanoparticles can likewise be alumina (e.g., modified or unmodified). In some examples, the inorganic nanoparticles can include pseudo-boehmite, which is aluminum oxide/hydroxide ($Al_2O_3 \times n\ H_2O$ where n is from 1 to 1.5). Commercially available inorganic nanoparticles can also be used, including, but not limited to, Disperal®HP10 and/or Disperal®HP14 boehmite (from Sasol) and/or Cab-O-Sperse® PG003 and/or CabotSpectrAl®81 fumed alumina (from Cabot).

With reference to the aluminum silicate component that can be present in the second coating 130, any of a number of shapes or morphologies can be present, including plate-shaped and/or irregularly-shaped aluminum silicate particles. In further detail, multiple inorganic pigments can be present of the same or different shape. Examples of aluminum silicates that can be used include clay, calcined clay, and/or kaolin. The term "irregularly-shaped," can refer to aluminum silicates or other inorganic pigments that have angular edges and voids, and on average, may not be generally completely circular and/or uniformly flat in its morphology.

The aluminum silicate in the second coating (and possibly in the first coating if used therein) can have an average aspect ratio from 1:1 to 25:1. In other examples, the aluminum silicate can have an average aspect ratio from 1:1 to 8:1. In yet another example, the aluminum silicate can have an average aspect ratio from 1:1 to 2:1. It is noted that an irregularly-shaped inorganic pigment, such as calcined clay, can still have an average aspect ratio of about 1:1, e.g., from 1:1 to 25:1, because angular edges and voids may still provide a particle with a low aspect ratio, though not smooth or substantially spherical. In other examples, however, the aluminum silicate can have an average aspect ratio from 1.5:1 to 25:1, or from 1.5:1 to 8:1. In still other examples, the aluminum silicate can have an average aspect ratio from 2:1 to 25:1, or from 2:1 to 8:1. In further detail, in the second coating 130, the inorganic nanoparticles and the aluminum silicate can be present at a weight ratio of 2:1 to 1:5, or from 1.5:1 to 1:4, or from 1:1 to 1:3.

The second coating 130 can include a second binder. In one aspect, the second binder can be the same or different from the first binder in the first coating 120. The second binder can include a water-dispersible binder, a water-soluble binder, or a combination thereof. The water-dispersible binder can include, but is not limited to, conjugated diene copolymer latexes, such as styrene-butadiene copolymer or acrylonitrile-butadiene copolymer; acrylic copolymer latexes, such as polymer of acrylic acid ester or methacrylic acid ester or methyl methacrylate-butadiene copolymer; vinyl copolymer latexes, such as ethylene-vinyl acetate copolymer and vinyl chloride-vinyl acetate copolymer; urethane resin latexes; alkyd resin latexes; unsaturated polyester resin latexes; and/or thermosetting synthetic resins, such as melamine resins and urea resins, or a combination thereof. The water-soluble binder includes, but is not limited to, starch derivatives such as oxidized starch, etherified starch, and phosphate starch; cellulose derivatives such as methylcellulose, carboxymethylcellulose, and hydroxyethyl cellulose; polyvinyl alcohol derivatives such as polyvinyl alcohol or silanol modified polyvinyl alcohol; natural polymeric resins such as casein, and/or gelatin or their modified products, soybean protein, pullulan, gum arabic, karaya gum, and albumin or their derivatives; vinyl polymers such as sodium polyacrylate, polyacrylamide, and/or polyvinylpyrrolidone; sodium alginate; polypropylene glycol; polyethylene glycol; maleic anhydride; and/or copolymers thereof. In an example, the second binder can include a polyvinyl alcohol, such as MOWIOL® 4088 (Kuraray America Inc.).

The second binder can be present in the second coating 130 in an amount of from about 1 to about 20 mass parts with respect to 100 mass parts of the total solid content of the inorganic nanoparticles in the second coating. In an example, the second binder can be present in the second coating in an amount of from about 5 to about 20 mass parts with respect to 100 mass parts of the total solid content of the inorganic nanoparticles in the second coating. As a further example, the second binder can be present in the second coating in an amount of from about 7 to about 16 mass parts with respect to 100 mass parts of the total solid content of the inorganic nanoparticle in the second coating.

The second coating 130 can include additional components and/or additives, such as other inorganic pigment, pigment dispersant, a thickener, a flow modifier, a viscosity stabilizer, a pH adjuster, a surfactant, a defoamer, a wetting agent, an antifoamer, a releasing agent, a foaming agent, a penetrant, a coloring dye, a coloring pigment, a white inorganic pigment, a white organic pigment, an optical brightener, an ultraviolet absorber, an antioxidant, a leveling agent, a preservative, a fungicide, an insolubilizer, a wet paper strengthening agent, and/or a dry paper strengthening agent as appropriate.

The second coating 130 can be applied at a coating weight ranging from about 2 to about 8 g/m², for example, from about 3 to about 7 g/m², and as a further example from about 4 to about 6 g/m².

Figure 2:
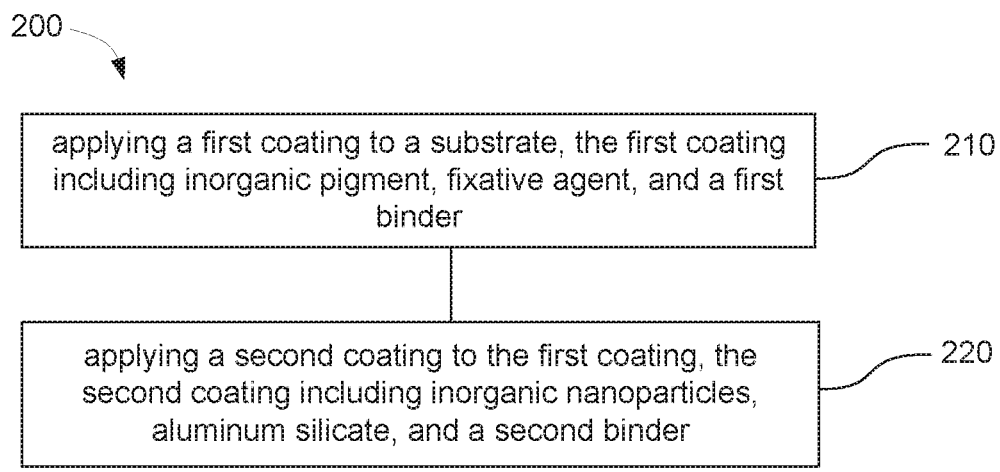
FIG. 2 is a flowchart illustrating an example method of making a recording medium in accordance with examples of the present disclosure.

As shown in FIG. 2, an example method 200 of making the recording medium can include applying 210 a first coating to a substrate, and applying 220 a second coating to the first coating. The first coating can include inorganic pigment, fixative agent, and a first binder. The second coating can include inorganic nanoparticles, aluminum silicate, and a second binder. In one example, the first coating can have a first dry coat weight from 4 g/m² to 20 g/m², and/or the second coating has a second dry coat weight from 2 g/m² to 8 g/m². In further detail, the method can further include applying the first and second coatings to a single side of the substrate (shown in FIG. 1), or to both sides of the substrate (not shown). In another aspect, the first coating can be applied directly to the substrate without any intervening coatings. In another aspect, the second coating can be applied directly to the first coating without any intervening coatings. The method can also include a drying step after application of the first coating and before application of the second coating, and/or the method can further include a drying step after application of the second coating.

The method of applying the first coating and the second coating is not particularly limited. For example, the first coating can be applied to the substrate and the second coating to the first coating using a coating device. Examples of the coating device include, but are not limited to various blade coaters (such as rod blade coaters), air knife coaters, roll coaters, bar coaters, curtain coaters, or short dwell coaters. In a more specific example, the coating device can be a blade coater, a curtain coater, or a film transfer coater, which can be suitable for high speed production. In another example, the first and/or second coatings can be applied using a Meyer rod.

The surface of the first coating and the second coating can be smoothened, as appropriate, by calendering treatment using, for example, a machine calender, a soft nip calender, a super calender, a multistage calender, and/or a multi-nip calender. However, the first coating and the second coating may or may not undergo calendering treatment. In other examples, the recording medium can be calendered after printing thereon using an inkjet ink composition. Thus, calendering can occur after one or both coating layer applications and/or after printing inkjet ink thereon. In further detail, the surface of the second coating can have a 75-degree gloss value as measure using BYK Gardner Gloss Meter of 55% or more, of 60% or more, or in some instances, 65% or more. The 75-degree gloss value can range from about 55% to about 90%, and more typically, from about 60% to about 80%.

Figure 3:
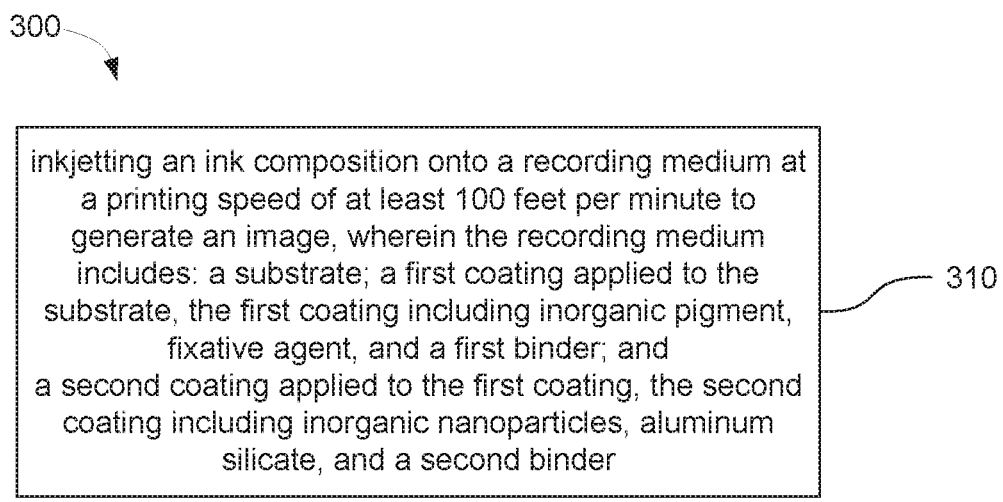
FIG. 3 is a flowchart illustrating an example method of printing in accordance with the present disclosure.

In another example, as shown in FIG. 3, a method 300 of printing can include inkjetting 310 an ink composition onto a recording medium at a printing speed of at least 100 feet per minute (fpm) to generate an image. The printing speed can alternatively be at least 200 fpm, at least 400 fpm, from 100 fpm to 1000 fpm, from 200 fpm to 1000 fpm, from 400 fpm to 1000 fpm, from 200 fpm to 800 fpm, from 400 fpm to 800 fpm, etc. The recording medium can include a substrate, a first coating applied to the substrate, and a second coating applied to the first coating. The first coating can include inorganic pigment, fixative agent, and a first binder. The second coating can include inorganic nanoparticles, aluminum silicate, and a second binder. In one example, the method can further include calendering the recording medium at from 50° C. to 150° C. at a pressure from 1,000 psi to 3,500 psi to generate a media gloss of least 55% reflectance measured at 75°, or a media gloss of at least 60%, or at least 65% in some instances. Furthermore, when printed thereon with a pigmented inkjet ink composition, in some examples, a color gloss of least 70% reflectance measured at 75° can be generated, or a color gloss of at least about 74% reflectance can be measured.

In accordance with this example, the term "inkjetting" includes any method in which a stream of droplets of ink are jetted onto the recording medium to form a printed image. The ink composition can be established on the recording medium via any suitable inkjet printing technique. Examples of inkjet methods include charge control methods that uses electrostatic attraction to eject an ink, a drop-on-demand method which uses vibrational pressure of a Piezo element, an acoustic inkjet method in which an electric signal is transformed into an acoustic beam, or a thermal inkjet method that uses pressure caused by bubbles formed by heating ink. In some examples, the ink composition can be applied onto the recording media using inkjet nozzles. In other examples, the ink composition can be applied onto the recording method using thermal inkjet printheads.

EXAMPLES

Example 1—Recording Media Preparation

Two reference ink compositions (Reference 1 and Reference 2) and two example ink compositions (Sample 1 and Sample 2) were prepared using the formulations shown in Table 1.

TABLE 1

Fist and Second Coating Formulations/Processing Details for Recording Medium

| Component | Reference 1 | Reference 2 | Sample 1 | Sample 2 |
|---|---|---|---|---|
| First Coating | Dry Parts by Mass | | | |
| Ground Calcium Carbonate | 60 | 60 | 60 | 60 |
| Aluminum Silicate | 40 | 40 | 40 | 40 |
| Styrene butadiene acrylonitrile (SBA) latex | 10 | 10 | 10 | 10 |
| Polyvinyl alcohol binder | 1 | 4 | 4 | 4 |
| $CaCl_2$ | 2 | 7 | 5 | 7 |
| Coat Weight (g/m²) | 12 | 10 | 6 | 6 |
| Second Coating | Dry Parts by Mass | | | |
| Aluminum Silicate | — | — | 50 | 75 |
| Polyvinyl alcohol binder | — | 8 | 8 | 8 |
| Wetting Agent | — | 0.25 | 0.25 | 0.25 |
| Defoamer | — | 0.6 | — | — |
| Boehmite alumina hydrate | — | 100 | 50 | 25 |

TABLE 1-continued

First and Second Coating Formulations/Processing Details for Recording Medium

| Component | Reference 1 | Reference 2 | Sample 1 | Sample 2 |
|---|---|---|---|---|
| Coat Weight (g/m$^2$) | N/A | 2 | 6 | 6 |
| Calender (° C./psi/Passes) | 120/3000/2 | RT/2500/2 | 120/3000/2 | 120/3000/2 |
| Durability after print | 2 | 4 | 4.5 | 4.5 |
| Media Gloss (75°) | 48 | 60 | 68 | 62 |
| Color Gloss (75°) | 50 | 73 | 76 | 74 |
| Image Quality (Bleed) | 2 | 3.5 | 4 | 4 |

In the First Coating, the calcined clay is a plate-shaped and irregularly-shaped inorganic pigment, KaMin™ 2000 C available from KaMin LLC, Macon, Ga. The SBA Latex is a first binder, for example, a styrene-butadiene copolymer, LITEX® PX 9740 available from Synthomer, Atlanta, Ga. The polyvinyl alcohol is an additional first binder, for example, MOWIOL® 4-98 (Kuraray America Inc.) The CaCl$_2$ is a fixative agent available from Cal-Chlor Corporation, Lafayette, La. The "GCC" is an irregularly-shaped rhombohedral inorganic pigment, for example, a ground calcium carbonate OMYA COVERCARB® 85, available from OMYA AG, Oftringen, Switzerland.

In the Second Coating, the polyvinyl alcohol is a second binder, such as a polyvinyl alcohol, MOWIOL® 4088 (Kuraray America Inc.). The wetting agent in Reference 2 is a clear liquid nonionic organic surfactant, TECO® Wet 510 available from Evonik Industries AG. The wetting agent in Samples 1 and 2 is Rhodoline 3300, which is an (alkylphenol ethoxylate)-free nonionic compound from Solvay. The defoamer is a mixture of hydrophobic solids and polysiloxanes, BYK® 018 available from Byk. The boehmite alumina hydrate is an inorganic nanoparticle, DISPERSAL® HP14, available from Sasol North America, Inc.

Reference 1, Reference 2, Sample 1, and Sample 2 recording media were each prepared by first, applying the first coating to a substrate, namely 75 g/m$^2$ Hammermill uncoated plain office paper from International Paper Company, at the coating weight specified in Table 1 using a Meyer Rod. The first coating was allowed to dry with hot air for 30 second. A second coating was then applied to the dried first coating at the coating weight specified in Table 1 using a Meyer Rod. The second coating was allowed to dry with hot air for 30 second. The recording medium was then calendered as shown in Table 1 above prior to printing. The recording media were then each printed using an HP CM8060 MFP with WebPress inkjet inks (A50). The prints were made using a 2 pass/6 dry spin mode printer setting. The printed recording media were then each tested for durability and image quality.

Example 2—Recording Media Durability

The durability of each of the printed images was tested according to the following protocols.

Durability was tested using Finger Smudge and Eraser Durability. Finger Smudge testing was carried out by placing a finger on the printed sample with a force sufficient to bend backwards at the knuckle and drawn down. Eraser durability was carried out with a pencil eraser mounted on a force spring to provide a consistent and reproducible pressure. The pencil eraser was pressed against the printed sample and drawn down. In each case, the prints were visually rated according to a 1-5 scale as follows: 5—no damage; 4—very slight damage; 3—some of the ink gone; 2—greater than 50% of the ink removed; and 1—white paper visible with ink total damage or transfer. The results of the two durability tests were averaged for each printed sample and are shown in Table 1.

Example 3—Recording Media Image Quality

The image quality of each of the printed images was tested according to the following protocols.

Image quality (bleeding) was tested by printing a black line immediately adjacent to a solid yellow line (touching) to see how much ink spread from the black line into the yellow color. The printed samples were visually rated according to a 1-5 scale as follows: 5—no bleeding; 4—very slight bleeding; 3—some bleeding; 2—significant bleeding; and 1—ink flow. The results of the image quality test are also shown in Table 1.

Example 4—Recording Media Gloss

The gloss for each of the printed images was tested according to the following protocols.

The gloss was measured using BYK Gardner Gloss Meter at 75 degrees. The Media Gloss was measured at unprinted portions of the various recording media, and the Color Gloss was measured by printing multiple colors, measuring the gloss, and taking an average gloss across all of the colors. The results of the gloss test are shown in Table 1.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A recording medium, comprising:
    a substrate;
    a first coating applied to the substrate, the first coating including inorganic pigment, fixative agent, and a first binder; and
    a second coating applied to the first coating, the second coating including inorganic nanoparticles, aluminum silicate, and a second binder, wherein:
        the aluminum silicate of the second coating includes plate-shaped aluminum silicate particles, irregularly-shaped aluminum silicate particles, or a combination thereof.

2. The recording medium of claim 1, wherein the inorganic pigment of the first coating includes plate-shaped aluminum silicate, irregularly-shaped aluminum silicate, irregularly-shaped rhombohedral calcium carbonate, or a combination thereof.

3. The recording medium of claim 1, wherein the first binder and the second binder independently include a conjugated diene copolymer latex, an acrylic copolymer latex, a vinyl copolymer latex, a urethane resin latex, an alkyl resin latex, an unsaturated polyester resin latex, a thermosetting synthetic resin, a starch derivative, a cellulose derivative, a polyvinyl alcohol derivative, a natural polymeric resin, vinyl polymer, a sodium alginate, a polypropylene glycol, a polyethylene glycol, a maleic anhydride, or a combination thereof, or a copolymer thereof.

4. The recording medium of claim 1, wherein the first binder and the second binder independently include styrene-butadiene copolymer, polyvinyl alcohol, or a combination thereof.

5. The recording medium of claim 1, wherein the first binder in the first coating is present from about 1 to about 18 mass parts with respect to 100 mass parts of a total solid content of the inorganic pigment in the first coating, and wherein the second binder in the second coating is present from about 1 to about 20 mass parts with respect to 100 mass parts of a total solid content of the inorganic nanoparticles and the aluminum silicate in the second coating.

6. The recording medium of claim 1, wherein the fixative agent comprises a polyvalent cation salt which includes a cation selected from calcium, cadmium, copper, iron, magnesium, nickel, zinc, aluminum, or zirconium, and wherein the fixative agent in the first coating is present from about 2 to about 10 mass parts with respect to 100 mass parts of a total solid content of the inorganic pigment in the first coating.

7. The recording medium of claim 1, wherein the inorganic nanoparticles are selected from boehmite, hydrated alumina, fumed alumina, colloidal silica, precipitated silica, silica gel, fumed silica, or a combination thereof.

8. The recording medium of claim 1, wherein the aluminum silicate in the second coating has an average aspect ratio from 1:1 to 25:1.

9. The recording medium of claim 1, wherein the inorganic nanoparticles and the aluminum silicate are present in the second coating at a weight ratio of 2:1 to 1:5.

10. The recording medium of claim 1, wherein the first coating has a first dry coat weight from 4 $g/m^2$ to 20 $g/m^2$, and the second coating has a second dry coat weight from 2 $g/m^2$ to 8 $g/m^2$.

11. A method of making the recording medium of claim 1, comprising:
applying the first coating to the substrate; and
applying the second coating to the first coating.

12. The method of claim 11, wherein the first coating has a first dry coat weight from 4 $g/m^2$ to 20 $g/m^2$, and the second coating has a second dry coat weight from 2 $g/m^2$ to 8 $g/m^2$.

13. The method of claim 11, further comprising calendering one or both of the first coating or the second coating at from 50° C. to 150° C. at a pressure from 1,000 psi to 3,500 psi, wherein recording medium exhibits a media gloss of least 55% reflectance measured at 75°.

14. A method of printing, comprising inkjetting an ink composition onto the recording medium of claim 1 at a printing speed of at least 100 feet per minute to generate an image.

15. The method of claim 14, further comprising calendering the recording medium at from 50° C. to 150° C. at a pressure from 1,000 psi to 3,500 psi before inkjetting the ink composition thereon, wherein recording medium exhibits a media gloss of least 55% reflectance measured at 75°, and wherein the ink composition applied to the recording medium exhibits color gloss of least 70% reflectance measured at 75°.

16. The recording medium of claim 1, wherein the aluminum silicate in the second coating includes the plate-shaped aluminum silicate particles, and the irregularly-shaped aluminum silicate particles.

17. The method of claim 14, wherein the printing speed is from 200 fpm to 800 fpm.

18. The recording medium of claim 1, wherein the inorganic nanoparticles of the second coating includes the plate-shaped calcined clay, the irregularly-shaped calcined clay, or both.

* * * * *